March 29, 1938.  G. L. DAVIES  2,112,560
ELECTROMECHANICAL FREQUENCY SELECTOR
Filed March 10, 1936
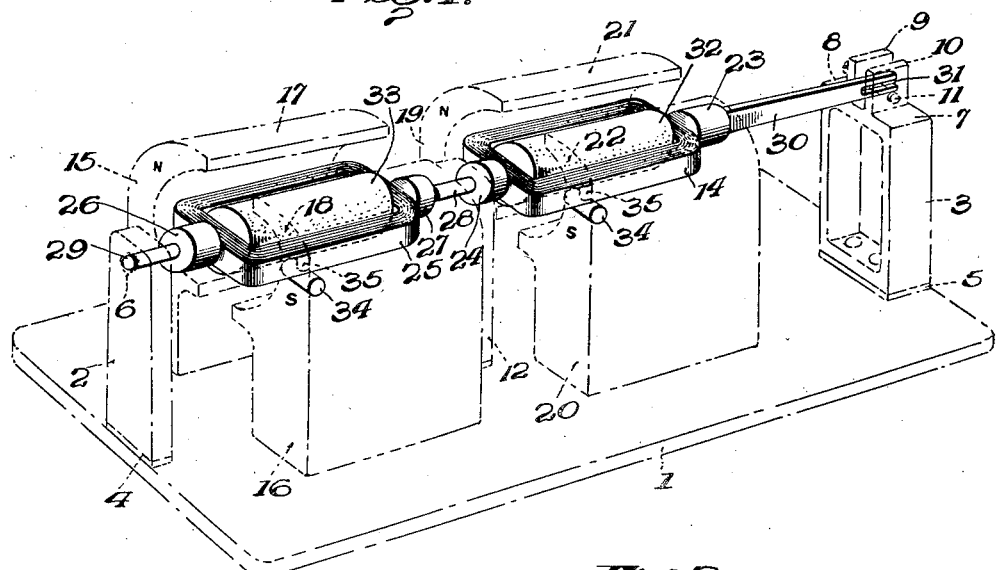
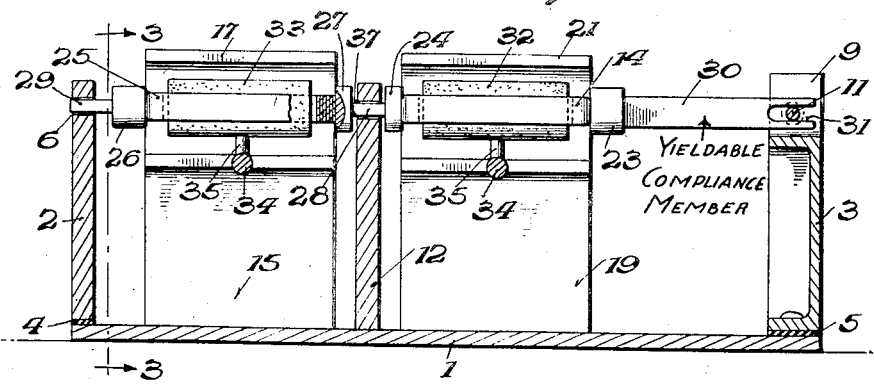
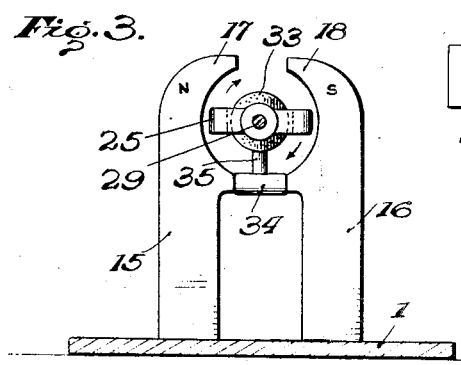
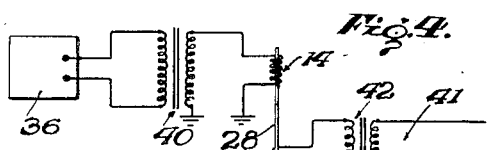
Inventor
Gomer L. Davies Patented Mar. 29, 1938

2,112,560

UNITED STATES PATENT OFFICE 2,112,560

ELECTROMECHANICAL FREQUENCY SELECTOR

Gomer L. Davies, Cleveland, Ohio, assignor to Washington Institute of Technology, Inc., Washington, D. C., a corporation of Delaware Application March 10, 1936, Serial No. 68,134

17 Claims. (Cl. 171—123)

The present invention relates to electro-mechanical frequency selectors of the type disclosed in my co-pending application Serial No. 699,052, filed November 21, 1933, now Patent No. 2,050,165 and the present application is a continuation in part of that application as respects all subject matter common to the two applications.

Electro-mechanical frequency selectors of the type disclosed in this and my co-pending application are adapted to include connected motor and generator elements, these being so constructed and arranged as to form an assembly mounted for oscillatory movement and having a pre-determined natural period of vibration. Both the motor and generator elements of the vibratory assembly are mounted in the fields of permanent or electric magnets, in order that if an alternating current, having a frequency lying within a narrow band including the pre-determined natural mechanical frequency of the vibrating system, is supplied to the motor element, the vibrating system will be caused to oscillate at the frequency of the input current and the generator element will consequently deliver an alternating current of the same frequency. The vibratory system is responsive only to a very narrow range of frequencies including the pre-determined natural mechanical frequency thereof and consequently the device is highly selective and may be employed to determine the presence of an alternating current of a known frequency.

Assuming that there is supplied to the motor element an alternating current having a frequency approximately equal to the natural mechanical frequency of the vibratory assembly, oscillation of the assembly will be set up and the amplitude of such mechanical oscillation will be proportional to the amplitude of the input current having the pre-determined frequency. The amplitude of the current delivered by the generator element will therefore be proportional to that of the driving current of the pre-determined frequency. It will therefore be seen that the device may be employed to determine not only the presence of an alternating current of pre-determined frequency but the amplitude of such current as well.

It is an object of the present invention to provide a device of the type described which will incorporate certain novel and improved features not found in the device disclosed in my co-pending application, and which will be susceptible of more simple manufacture.

It is particularly intended by this invention to provide a device of the type described in which the vibrating system is connected to the fixed frame by a single linear compliance element.

It is another object of the invention to provide a frequency selector including an oscillatory system, in which means are provided for varying the natural mechanical frequency of the oscillatory system.

It is also an object of the invention to so construct and arrange the compliance element connecting the vibratory system to the frame that adjustment thereof and of the vibratory system with respect to the frame may be made.

Other objects and features of novelty will be apparent from the following description and the annexed drawing, it being expressly understood, however, that the invention is in no way limited by such description and drawing, or otherwise than by the appended claims.

Referring to the drawing, in which similar reference numerals refer to like parts, Fig. 1 is a perspective view of a device constructed according to the invention, Fig. 2 is a longitudinal sectional view of the device disclosed in Fig. 1, Fig. 3 is a sectional view taken on the line 3—3 of Fig. 2, and Fig. 4 is a circuit diagram showing the use of the device according to the invention.

The electro-mechanical frequency selector disclosed in the drawing and which is constructed according to the present invention comprises a frame or base 1 which is intended to be maintained fixed with respect to the oscillatory system, and which may be of any desired shape or configuration, it being shown as being of substantially rectangular, flat configuration in the embodiment disclosed. Extending above the plane of the base 1 and preferably at opposite ends thereof are aligned supports 2, 3, the same being completely insulated from the base 1 by insulators 4, 5. Adjacent the upper end of support 2 there is provided a bearing opening 6 therein for a purpose to be described hereinafter. The upper end of support 3 is provided with a pair of upstanding, spaced, co-operating ears 9, 10 defining a vertical, flat aperture therebetween. The ears 9, 10 are so formed that they have a certain amount of resilience and may be drawn together by means of a screw 11 which is threaded through aligned holes in the two ear members. The aperture between the ears 9, 10 is substantially aligned with the bearing opening 6 in support 2, for a purpose which will appear hereinafter. A third support 12 is disposed on the base 1 between the supports 2 and 3, and is provided adjacent its upper end with a bearing opening 37 which is aligned with bearing opening 6 and the aperture between the ears 9, 10. It will be seen that the support 12 has not been illustrated in Fig. 1, this being in order to clarify the disclosure of that figure.

Means are provided by the invention for setting up magnetic fields for a purpose which will appear hereinafter, and such means comprise two pairs of magnets, which may be either permanent or electric magnets, these pairs being arranged preferably on opposite sides of the support 12. The magnets 15, 16 of one pair are provided at their upper ends with facing pole pieces 17, 18 of opposite polarity, while the other pair of magnets 19, 20 are provided at their upper ends with facing pole pieces 21, 22 of opposite polarity. The pole pieces of each pair of magnets are so constructed as to define a substantially cylindrical opening therebetween and these openings are axially aligned with each other and with the bearing openings 6 and 37 and the aperture between the ears 9, 10.

Disposed between the pole pieces 21, 22 and in the magnetic field therebetween, and supported there in a manner to be described hereinafter, is a driving or motor coil 14, the same being formed as a flat hollow coil formed of a plurality of turns of wire and being elongated generally in the direction between the supports 2, 3. The outer end of the coil is attached to an end member 23 formed of brass or other suitable material, while the inner end of the coil is attached to a second end member 24 which may also be formed of brass or other suitable material. The coil 14 is generally flat, as stated hereinbefore, and the plane of the coil is perpendicular to the centers of the pole faces 21, 22 of the magnets 19, 20.

Disposed between the pole pieces 17, 18 of magnets 15, 16 and supported there in a manner to be described hereinafter is a generating coil 25, the same being formed and disposed in the same manner as the driving coil 14. The outer end of generator coil 25 is attached to an end member 26, while the inner end thereof is attached to an end member 27, both of such end members being formed of brass or other suitable material.

The coils 14 and 25 are rigidly connected together to turn as a unit and such connection may be effected by means of a shaft 28 which is rigidly connected at its ends to the facing end members 24 and 27. The shaft 28 is supported above the base 1 by being received within the bearing opening 37 in the central support 12 and it will thus be seen that the shaft 28 provides a rigid connection betwen coils 14 and 25 and also supports the center of the rotary oscillatory system above the base 1. The rotary assembly is also rotatably supported by the support 2 by means of a shaft 29 which is attached to the end member 26 of coil 25 and which shaft is rotatably supported in the bearing opening 6 in support 2.

Means are provided by the invention for resiliently connecting the oscillatory system to the base or frame 1 in such a manner that when the same is rotated through any small angle such resilient connecting means will serve to return it to normal position. Such connecting means comprises the elongated flat strip of metal 30, one end of which is rigidly conected to the end member 23, which is attached to coil 14, and the other end of which is received in the aperture in support 3 between the ears 9, 10. The end of strip 30 which is received within the aperture in support 3 is bifurcated, as illustrated in Fig. 1, to provide a slot 31 therein through which the screw 11 passes. It will be apparent that if the ears 9, 10 are drawn tightly together the bifurcated end of strip 30 will be gripped tightly therebetween while, if desired, the grip of ears 9, 10 on the strip may be relieved so that the effective length of the strip may be increased or decreased by moving the entire oscillatory assembly toward or away from the support 3, the slot 31 accommodating screw 11 during such movement.

Arranged within the coils 14 and 25 respectively are core pieces 32, 33 these being preferably of cylindrical shape to permit rotary oscillation of the coils thereabout. These core pieces are rigidly fixed with respect to the base by any suitable means, the non-magnetic supports 34, 35 being shown in the drawings by way of example although, if desired, the cores may be supported directly from the base 1. The core members themselves are adapted to be formed of some highly magnetic material such as soft iron.

In order to cause rotary oscillatory movement of the vibratory assembly, alternating current is adapted to be supplied to driving coil 14 by any suitable means such as through compliance strip 30 and end member 23, to which one terminal of coil 14 may be connected. The other end of coil 14 may be grounded through end member 24, shaft 28, support 12 and frame 1 in order to complete the input circuit through coil 14. Alternating current may be taken from generator coil 25 through a suitable lead which may, if desired, be connected to one end of coil 25 through shaft 29 and end member 26. The other end of coil 25 may be grounded through end member 27, shaft 28 and support 12 in order to complete the output circuit through the generator coil.

An electrical system including the electromechanical frequency selector of the present invention is illustrated in Fig. 4. In this circuit diagram detected current from the receiver 36 or other source of alternating currents is supplied through transformer 40 to driving coil 14. Coil 14 is rigidly connected, as by shaft 28 to generator coil 25, the terminals of which are connected to an output circuit 41 through transformer 42. The driving and generator coils 14 and 25 may be grounded through shaft 28, as described hereinbefore.

In the operation of the electro-mechanical frequency selector described, there may be supplied to the motor coil a number of alternating currents of different frequencies and if one of these currents has a frequency lying within a narrow band including the pre-determined natural mechanical frequency of the oscillatory system, movement of the motor coil in the magnetic field will take place, such movement being about the axis of the oscillatory system extending through shafts 28 and 29 and compliance element 30. Such rotary movement of the driving coil will drive the other elements of the oscillatory assembly, as all of such elements are rigidly connected together, and this rotary movement of the entire oscillatory system will be alternately in opposite directions due to the reversal of the direction of flow of the alternating current supplied to the driving coil. This oscillatory movement of the assembly is made possible by the resilient connection thereof to the frame through the compliance element. The compliance element permits rotary movement of the oscillatory system through only a very small arc and then acts to return the entire assembly to its normal position, when the cycle is initiated again. There is accordingly set up a rotary oscillation of the assembly, the frequency of this oscillation being equal to the pre-selected frequency of the alternating current supplied to the driving coil. Currents supplied to the driving coil and having a frequency unequal to the natural mechanical frequency of the vibratory assembly will cause no movement of such assembly and the device is therefore operable in the manner described only when an alternating current of a frequency lying within a narrow band including the natural mechanical frequency of the oscillatory assembly is supplied to the driving coil.

The oscillatory movement of the assembly causes the generating coil to oscillate in the field of magnets 15, 16 and an alternating voltage having a frequency equal to the frequency of vibration will be generated in such coil and will be supplied therefrom to lead the output circuit. Inasmuch as the oscillatory assembly responds only to a very narrow range of frequencies, only voltages having a frequency lying within this narrow range of frequencies will be generated in the generating coil and delivered thereby.

The natural mechanical frequency of the vibratory assembly may be changed within relatively narrow limits by varying the effective length of the compliance element 30, i. e. the length of this element between the support 3 and the end member 23. Such change in the length of this element may be effected by operation of the screw 11 to relieve the tension of ears 9, 10 on the strip 30 and adjustment of the length of the strip by moving the entire oscillatory assembly toward or away from the support 3, after which the screw may be tightened to clamp the strip in adjusted position.

It will be apparent that if the oscillatory system is tuned to have a natural mechanical frequency of 65 cycles per second, and an alternating current of that frequency is supplied to driving coil 14, the oscillatory system will be caused to vibrate with an equal frequency, and an alternating current having a frequency of 65 cycles per second will be generated in the coil 25. The amplitude of vibration of the oscillatory assembly will be directly proportional to the amplitude of the 65 cycle alternating current supplied to the driving coil, and the amplitude of the generated current will therefore be equal to that of the input current. Due to this, the device will indicate both the presence of an alternating current of a pre-determined frequency and the amplitude thereof.

While the above description and the annexed drawing represent one embodiment which this invention may take, it will be apparent to those skilled in the art that numerous features and structural details thereof are illustrative only and that many modifications may be made, and many different embodiments of the invention are possible without in any way departing from the scope of the invention, for the limits of which reference must be had to the appended claims.

I claim:

1. A frequency selector comprising a fixed support, a member having an end freely and rotatably journaled with respect to said support, a compliance member connecting the other end of said member to said support, means for causing rotary vibratory movement of said member, and means carried by said member and operable to generate an alternating current during said rotary vibratory movement.

2. A frequency selector comprising a support, a member having one end freely and rotatably journaled in said support and having another end yieldingly connected to said support, means for causing rotary vibratory movement of said member, and means carried by said member and operable to generate an alternating current during said rotary vibratory movement.

3. A frequency selector comprising a support, a member having one end freely and rotatably journaled with respect to said support, means for resiliently connecting the other end of said member to said support, means for causing rotary vibratory movement of said member, and means carried by said member and operable to generate an alternating current during said rotary vibratory movement.

4. A frequency selector comprising a support, means associated with said support for setting up a magnetic field, a member having a driving coil and a generating coil disposed in said magnetic field, means for supplying an alternating current to said driving coil, and means for taking an alternating current from said generating coil, one end of said member being freely and rotatably journaled in said support, and a yielding member connecting the other end of said member to said support.

5. A frequency selector comprising a support, a member having one end thereof rotatably journaled with respect to said support, and a yielding member connecting the other end of said member to said support, said member forming an assembly capable of rotary vibratory movement and having a pre-determined natural frequency of rotary vibration, means for causing rotary vibratory movement of said member, and means carried by said member and operable to generate an alternating current during said rotary vibratory movement.

6. A frequency selector comprising a support, a plurality of coils forming an assembly carried by said support, said assembly being freely and rotatably journaled at one end thereof with respect to said support, and a yielding member connecting the other end of said assembly to said support, means for setting up a magnetic field about said coils, means for supplying an alternating current to one of said coils to cause rotary vibratory movement of said assembly, and means for taking an alternating current from another of said coils.

7. A frequency selector comprising a support, an oscillatory assembly having one end thereof freely and rotatably journaled to said support, a compliance element having one end connected to said member and having the other end thereof adjustably connected to said support, means for causing oscillatory movement of said assembly, and means included in said assembly and operable during said vibratory movement for generating an alternating current.

8. A frequency selector comprising a support, an oscillatory assembly having one end thereof freely and rotatably journaled to said support, a compliance member having one end thereof connected to the second end of said assembly, the other end of said compliance element being received within an aperture in said support, means permitting said compliance element to be attached in different positions in said aperture, means for causing rotary vibratory movement of said member, and means carried by said member and operable during vibratory movement of said member for generating an alternating frequency.

9. A frequency selector comprising a support, an oscillatory assembly having one end thereof freely and rotatably journaled to said support, a compliance member having one end thereof connected to the second end of said assembly, the other end of said compliance element being bifurcated and received within an aperture defined by ears carried by said support, and means extending through the bifurcated end of said compliance element and connecting said ears and operable to clamp said bifurcated end between said ears, said assembly including means operable during oscillatory movement thereof for generating an alternating current.

10. A frequency selector comprising a support, a member comprising a plurality of separated coils mounted on said support for rotary vibratory movement, means arranged adjacent said coils for setting up a magnetic field within which said coils are disposed, a fixed core member disposed within each of said coils, means for supplying an alternating current to one of said coils to cause rotary vibratory movement of said members, and means for taking an alternating current from another of said coils.

11. A frequency selector comprising a support, a pair of magnets carried by said support and adapted to set up a magnetic field therebetween, a coil mounted in said magnetic field, a second pair of magnets carried by said support and adapted to set up a second magnetic field, a second coil mounted in the magnetic field set up by said second pair of magnets, said coils being rigidly connected together and a resilient compliance element connecting said coils to said support.

12. A frequency selector comprising a support, a pair of magnets carried by said support and adapted to set up a magnetic field therebetween, a coil mounted in said magnetic field, a core member disposed within said coil, a second pair of magnets carried by said support and adapted to set up a second magnetic field therebetween, a second coil disposed in said second magnetic field, a second core member disposed within said second coil, said coils being rigidly connected together, a resilient compliance member connecting said coils to said support, means for supplying an alternating current to one of said coils, and means for taking an alternating current from the other of said coils.

13. A frequency selector comprising a support, means associated with said support for setting up a magnetic field, a member having one end thereof freely and rotatably journaled in said support, a resilient compliance element connecting the other end of said member to said support, means connected to the intermediate portion of said member and disposed in said magnetic field and operable to cause rotation of said member through a limited arc, and other means connected to the intermediate portion of said member and disposed in said magnetic field and operable to generate a current during such limited rotary movement.

14. A frequency selector comprising a support, means associated with said support for setting up a magnetic field, a member having one end thereof freely and rotatably journaled in said support, a resilient compliance element connecting the other end of said member to said support, a coil carried by said member and disposed in said magnetic field and operable to cause rotary oscillation of said member when an alternating current is supplied to said coil, and a second coil carried by said member and operable to generate an alternating current during said rotary oscillation.

15. A frequency selector comprising a support, an oscillatory assembly having one end thereof freely and rotatably journaled to said support, a yielding member connecting the other end of said assembly to said support, said yielding member being adjustably connected to said support whereby the effective length thereof may be varied to vary the frequency of oscillation of said oscillatory assembly, means for causing oscillatory movement of said assembly, and means forming part of said assembly and operable to generate an alternating current during said oscillatory movement.

16. A frequency selector comprising a support, an oscillatory assembly having one end thereof freely and rotatably journaled to said support, a compliance member having one end thereof connected to the other end of said assembly, the other end of said compliance member being adjustably connected to said support to thereby permit the effective length of said compliance element to be varied, means for causing rotary oscillatory movement of said assembly, and means included in said assembly and operable to generate an alternating current during said oscillatory movement.

17. A frequency selector comprising a support, an oscillatory assembly having one end thereof freely and rotatably journaled to said support, a flat, elongated strip of resilient metallic material having one end thereof connected to the second end of said oscillatory assembly and having its other end connected to said support to thereby support said oscillatory assembly and permit rotary oscillatory movement thereof, and means forming a part of said assembly and operable during rotary oscillatory movement thereof for generating an alternating current.

GOMER L. DAVIES.